M. B. OKUN.
CORNER POST FASTENER FOR BEDS.
APPLICATION FILED MAY 20, 1918.
1,310,166.
Patented July 15, 1919.
4 SHEETS—SHEET 2.
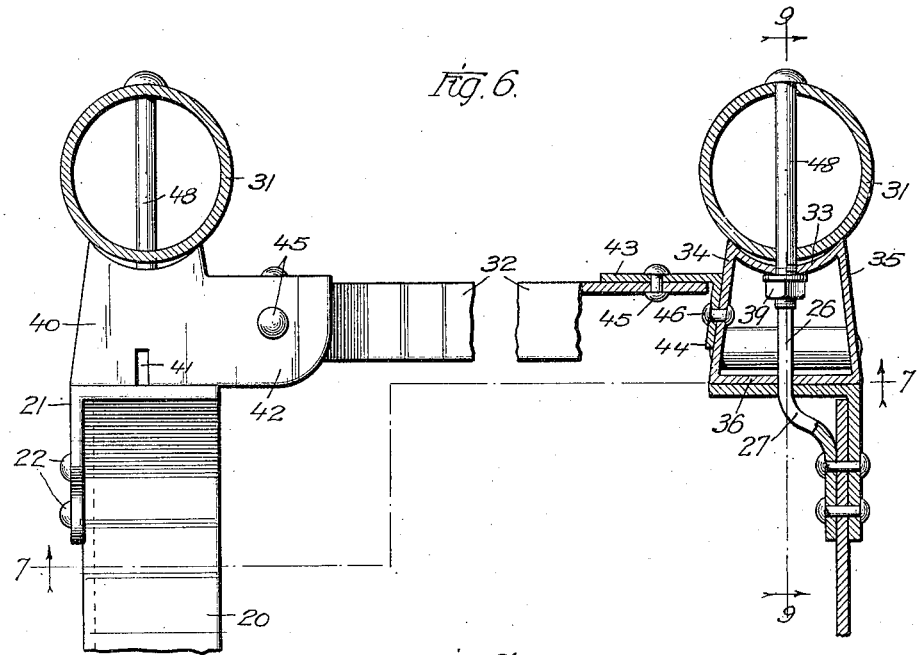
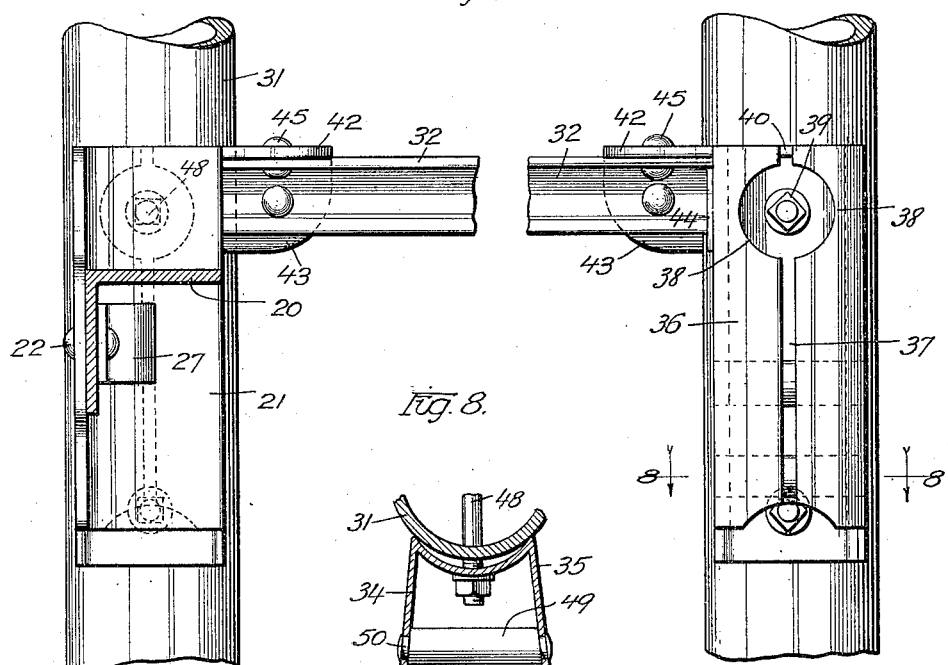

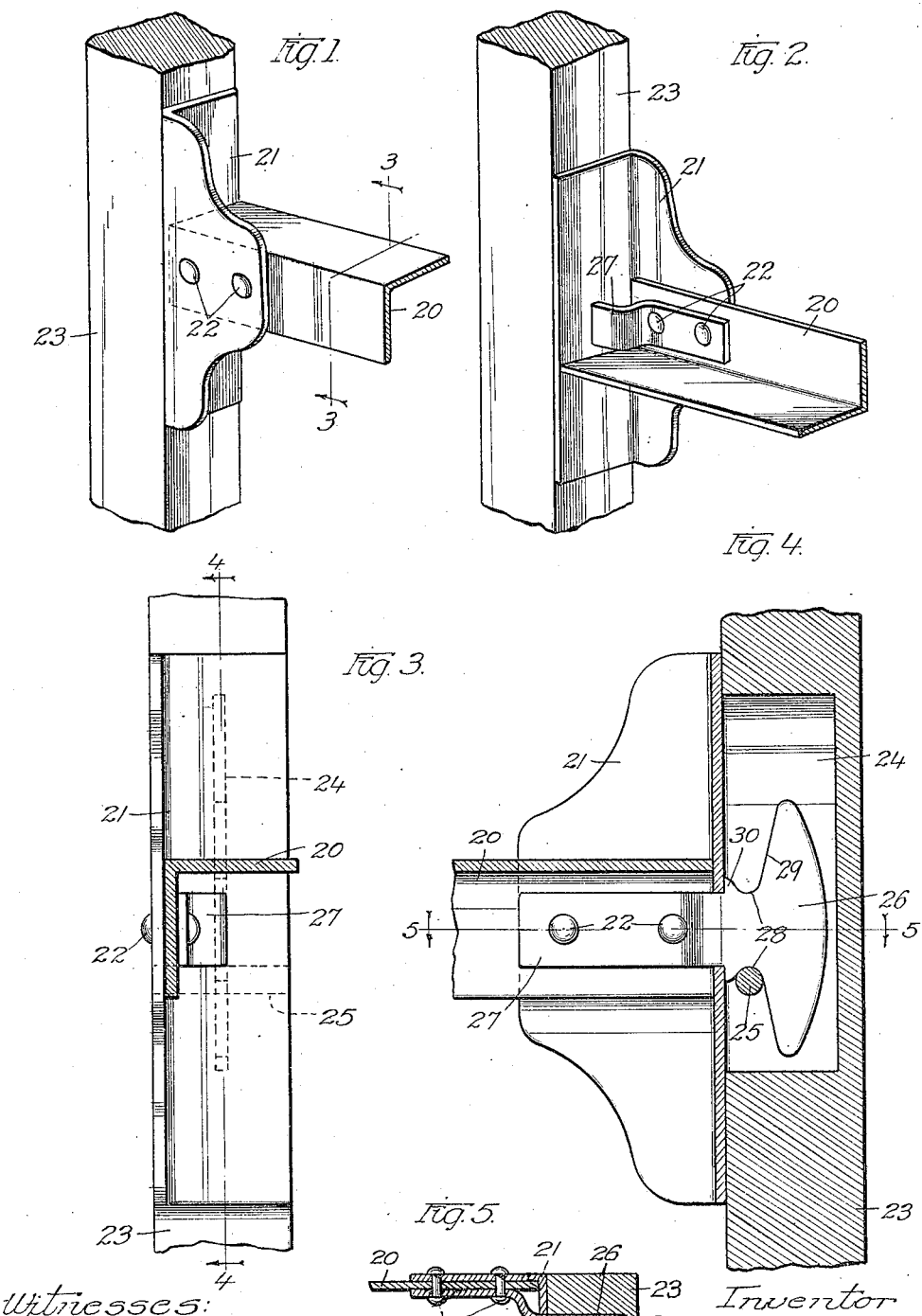

M. B. OKUN.
CORNER POST FASTENER FOR BEDS.
APPLICATION FILED MAY 20, 1918.
1,310,166.
Patented July 15, 1919.
4 SHEETS—SHEET 3.
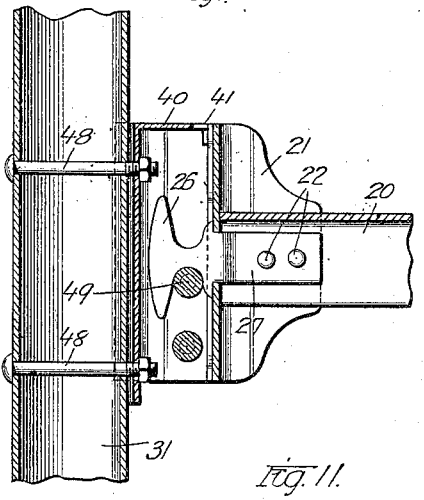
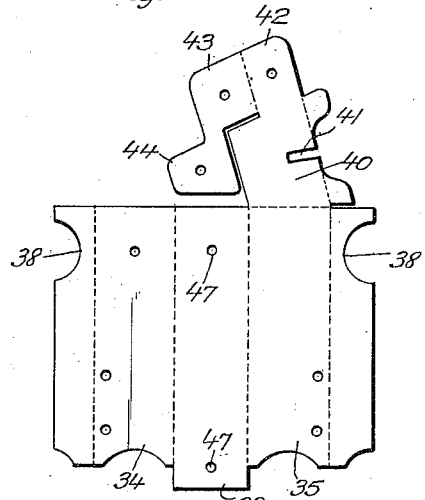
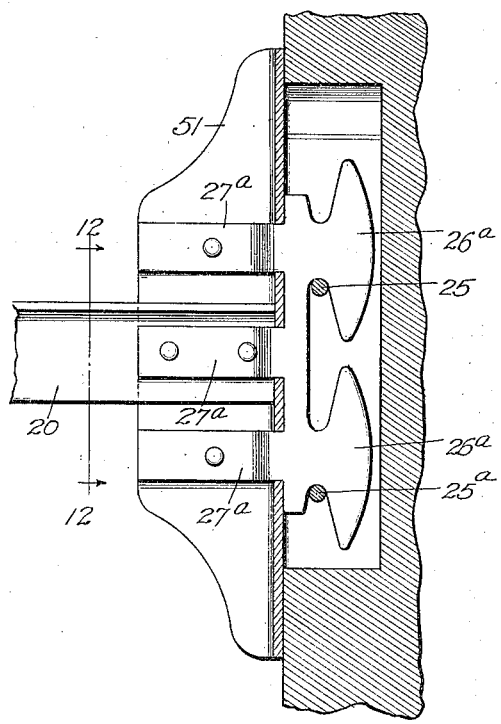
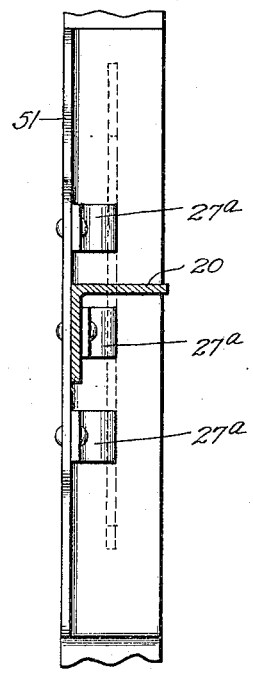
Witnesses:
Robert H. Weir
Arthur W. Carlson
Inventor
Morris B. Okun
by Gabel + Mueller
Attys:

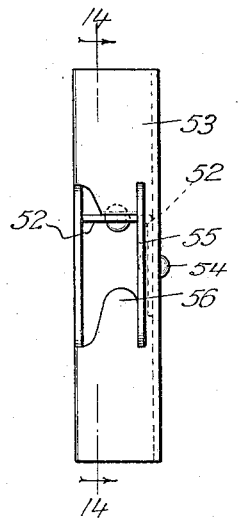
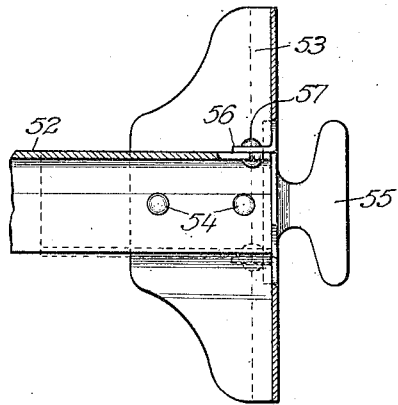
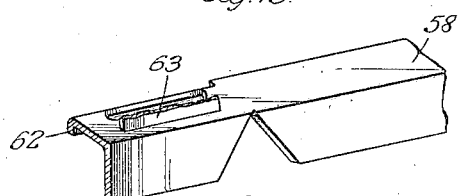
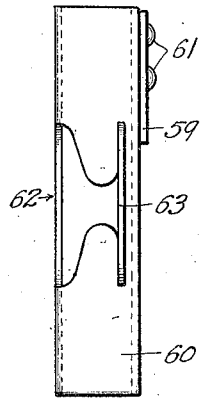
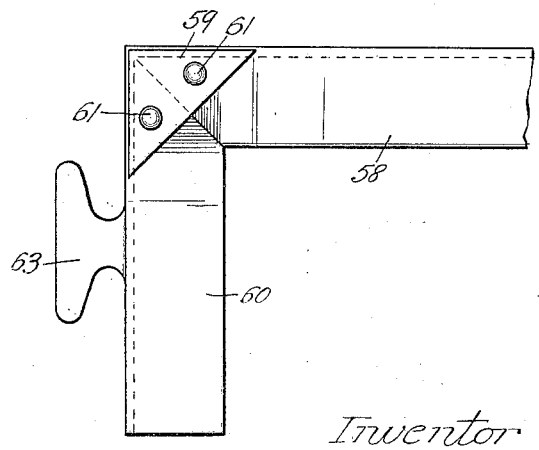

UNITED STATES PATENT OFFICE.

MORRIS B. OKUN, OF CHICAGO, ILLINOIS.

CORNER-POST FASTENER FOR BEDS.

1,310,166.  Specification of Letters Patent.  Patented July 15, 1919.

Application filed May 20, 1918. Serial No. 235,590.

*To all whom it may concern:*

Be it known that I, MORRIS B. OKUN, a citizen of the United States, residing at Chicago, in the county of Cook and State of Illinois, have invented a certain new and useful Improvement in Corner-Post Fasteners for Beds, of which the following is a full, clear, concise, and exact description, reference being had to the accompanying drawings, forming a part of this specification.

My invention relates to corner post fasteners for beds and has for its object the provision of an improved structure whereby the side rails of the bed may be suitably united to the posts of a bed regardless of whether these posts are of wooden design or of metal. The structure is such that the rails may be reversibly mounted in place. That portion of the mechanism which is applied to the rail itself remains the same irrespective of its use in connection with wood or metal posts, but the mounting mechanism as applied to the post itself varies in accordance as it may be applied to a wooden post or to a metal post.

My invention contemplates the provision of an exceedingly simplified structure, and also a structure which will firmly hold the bed parts together, but yet which is readily demountable.

I will explain my invention more in detail by referring to the accompanying drawings, in which—

Figure 1 is a fragmentary perspective view showing a side rail of a bed as mounted upon a post in accordance with the structure of my invention;

Fig. 2 is a similar view showing the side rail in its reversed position;

Fig. 3 is a sectional view on line 3—3 of Fig. 1;

Fig. 4 is a sectional view on line 4—4 of Fig. 3;

Fig. 5 is a sectional view on line 5—5 of Fig. 4;

Fig. 6 is a fragmentary top view, certain parts being shown in section of my improved side rail structure in connection with a corner post fastener as applied to metal bed posts;

Fig. 7 is a sectional view on line 7—7 of Fig. 6;

Fig. 8 is a sectional view on line 8—8 of Fig. 7;

Fig. 9 is a sectional view on line 9—9 of Fig. 6;

Fig. 10 is a developed view of the blank for forming the corner post fastener shown in Figs. 6, 7, 8 and 9;

Fig. 11 is a view similar to Fig. 4 showing a modified form of the structure of Fig. 4;

Fig. 12 is a sectional view on line 12—12 of Fig. 11;

Fig. 13 shows a modified form of side rail structure which may coöperate with the fastener means shown in the preceding figures;

Fig. 14 is a sectional view on line 14—14 of Fig. 13;

Fig. 15 shows a blank partly formed up of a further modified form of side rail structure which can coöperate with the fastening means shown in Figs. 1 to 12 inclusive;

Fig. 16 is an end view of the side rail blank of Fig. 15 shown in its finished condition, and Fig. 17 is a side view thereof.

By referring more particularly to Figs. 1, 2, 3, 4 and 5, I show a fragmentary end portion of a side rail 20 for a bed. This side rail has at its extremity an angular face plate 21 riveted thereto by the rivets 22. This face plate is adapted to abut a corner post 23 of the bed. In the illustrations of Figs. 1, 2, 3, 4 and 5, this corner post is designed to be of the customary wooden variety. The post has a recessed portion 24 preferably in the form of a slot across which extends a bolt 25. This bolt or hanger is adapted to coöperate with the reversible finger 26. This finger has a tail piece 27 by which it is riveted to and secured upon the side rail and face plate through the agency of the rivets 22. The finger 26 has recesses 28 adapted to fit the bolt 25.

In the form shown, the finger has flaring inclined sides as shown at 29 leading away from the recessed portions 28, these flaring portions serving to draw the side rail closely against the corner post when the two parts are hooked together as shown in the illustrations. Shoulders 30 are provided for the finger 26 which preferably abut the end face plate 21.

From this description the structure will be readily apparent. The finger 26 by virtue of its construction draws the side rail and post tightly together and the end face plate 21 maintains the proper rectangular relationship between these parts. The tail piece 27 of the finger 26 projects through a hole provided in the face plate and this also serves to strengthen the connection between the three parts 20, 21 and 27. By reason of the fact that the finger 26 is symmetrically constructed on its opposite sides, the structure is of the reversible type so that the side rail 20 may occupy either the position shown in Fig. 1 or the position shown in Fig. 2.

By referring more particularly to Figs. 6, 7, 8, 9 and 10 inclusive, I show the same side rail structure as applied to a specially constructed corner post fastener, in this instance shown as mounted upon metal end posts 31.

In Figs. 6 and 7, I have shown one extremity of the bed as being united by the end rail 32, the same being broken at its middle to facilitate the illustration thereof. This corner post fastener is illustrated in Figs. 6, 7, 8 and 9, and is shown as a developed blank before being bent into proper form in Fig. 10. This corner post fastener consists of the rounded back wall 33, the side walls 34, 35 and the front walls 36, 36. The front walls, as seen more clearly in Fig. 7 (right hand side) do not come together at their edges, but leave a slot 37 between them through which the finger 7 may be manipulated. The front walls 36 also have cut away portions as at 38 to form a central opening to permit of the passage therethrough of a suitable wrench to manipulate the nut 39, as will presently appear. The corner post fastener likewise has a top wall 40 having the slot 41 alined with the slot 37, which top wall closes the structure at the top and is continuous, there being a protruding shelf 42, which shelf has a downwardly extending wall 43 and a forwardly extending section 44.

The manner of forming the blank can thus be readily seen by comparing the parts as they appear in Fig. 10 with the parts as they appear in Figs. 6, 7, 8 and 9. The parts 42 and 43 serve to support the end rail 32 through the agency of the rivets 45. A rivet 46 holds the flange 44 tightly against the side wall 34. Holes 47 are provided in the back wall 33 to accommodate the bolts 48. It is by virtue of the bolts 48 and nuts 39 that the corner post fastener is held to the post 31. The cut away portions 38 permit manipulation of the nut 39 for this purpose. The structure of the corner post fastener is completed by the addition of the studs or hangers 49 whose protruding stems 50 (Fig. 8) are riveted in position upon the side walls 34, 35. The studs 49 have shoulders larger in dimension than the stems 50 so that these studs 49 strengthen the corner post fastener so that it may properly perform its function. These studs 49, as more clearly apparent from Fig. 9, coöperate with the finger 26 of the side rail to hold the side rail in position upon the bolts 31.

It will thus be seen that my improved end rail extremity coöperates with equal facility with wooden corner posts as with metal corner posts having corner post fasteners.

In Figs. 11 and 12, I show a duplex arrangement in that the side rail 20 is provided with a somewhat enlarged end face plate 51 and the parts 51 and 20 are riveted to a structure having two fingers 26$^a$, 26$^a$, respectively, these fingers being united with tail pieces 27$^a$. Suitable rivets hold the finger and tail piece structure rigid with the face plate structure 51 and the side rail 20. Two studs 25, 25 are then provided to coöperate with the two fingers 26$^a$, thus providing greater rigidity than would be the case if but one finger 26$^a$ were used. In other particulars, this structure of Figs. 11 and 12 is similar to that shown in Figs. 1 to 5 inclusive.

By referring more particularly to Figs. 13 to 17, I show two slightly modified structures for the side rail extremity. The structures illustrated in these figures, however, are of such character that they coöperate properly with the post fastening means shown in Figs. 1 to 10 inclusive.

Referring primarily to Figs. 13 and 14, I show a side rail 52 having an end face plate 53 which is suitably riveted to the side rail by the rivets 54. This end face plate has a finger 55 punched therefrom which performs the same functions as the finger 26. When the finger 55 is bent outwardly from the end face plate, there remain behind two fingers 56 and one of these fingers is utilized to further rivet the parts 52 and 53 together through the agency of the rivet 57. The arrangement is such that either one of the two fingers 56 may of course be bent over and riveted into position for the sake of reversibility, as desired.

In Figs. 15, 16, and 17, I avoid the use of a separate end face plate entirely by forming such a face plate with a projecting finger directly from a portion of the side rail itself. I then show the side rail 58 which primarily has a triangular section 59 punched therefrom. The side rail is then bent so that it forms the downwardly projecting face plate section 60, the two parts being more thoroughly held together by the addition of the element 59 secured to the two parts by the rivets 61. The face plate section 60 of the rail, as shown more clearly in Fig. 15, has a flange 62 bent downwardly to strengthen it and has a finger 63 punched out of the material of this end plate section, which finger again performs the same functions as the finger 26 or the finger 55 previously explained.

From what has been thus described the nature of my invention will be readily clear to those skilled in the art.

Having however thus described my invention, what I claim as new and desire to secure by Letters Patent is:

1. A side rail structure for beds comprising an angular metallic side rail, the extremities of said side rail being bent downwardly at right angles to the body portion of said side rail, and a pair of oppositely extending fingers punched out of the material of said downwardly extending extremities whereby said side rail structure may be reversibly mounted in place.

2. A side rail structure for beds comprising an angular metallic side rail, the extremities of said side rail being bent downwardly at right angles to the body portion of said side rail, and a pair of oppositely extending fingers forming a single unitary structure punched out of the material of said downwardly extending extremities whereby said side rail structure may be reversibly mounted in place.

3. A side rail structure for beds comprising an angular metallic side rail, the extremities of said side rail being bent downwardly at right angles to the body portion of said side rail, and a pair of oppositely extending fingers punched out of the material of said downwardly extending extremities whereby said side rail structure may be reversibly mounted in place, said downwardly extending extremities having inwardly bent strengthening flanges.

4. A side rail structure for beds comprising an angular metallic side rail, the extremities of said side rail being bent downwardly at right angles to the body portion of said side rail, and a pair of oppositely extending fingers forming a single unitary structure punched out of the material of said downwardly extending extremities whereby said side rail structure may be reversibly mounted in place, said downwardly extending extremities having inwardly bent strengthening flanges.

In witness whereof, I hereunto subscribe my name this 16th day of May, A. D. 1918.

MORRIS B. OKUN.

Copies of this patent may be obtained for five cents each, by addressing the "Commissioner of Patents, Washington, D. C."